Figure 1:
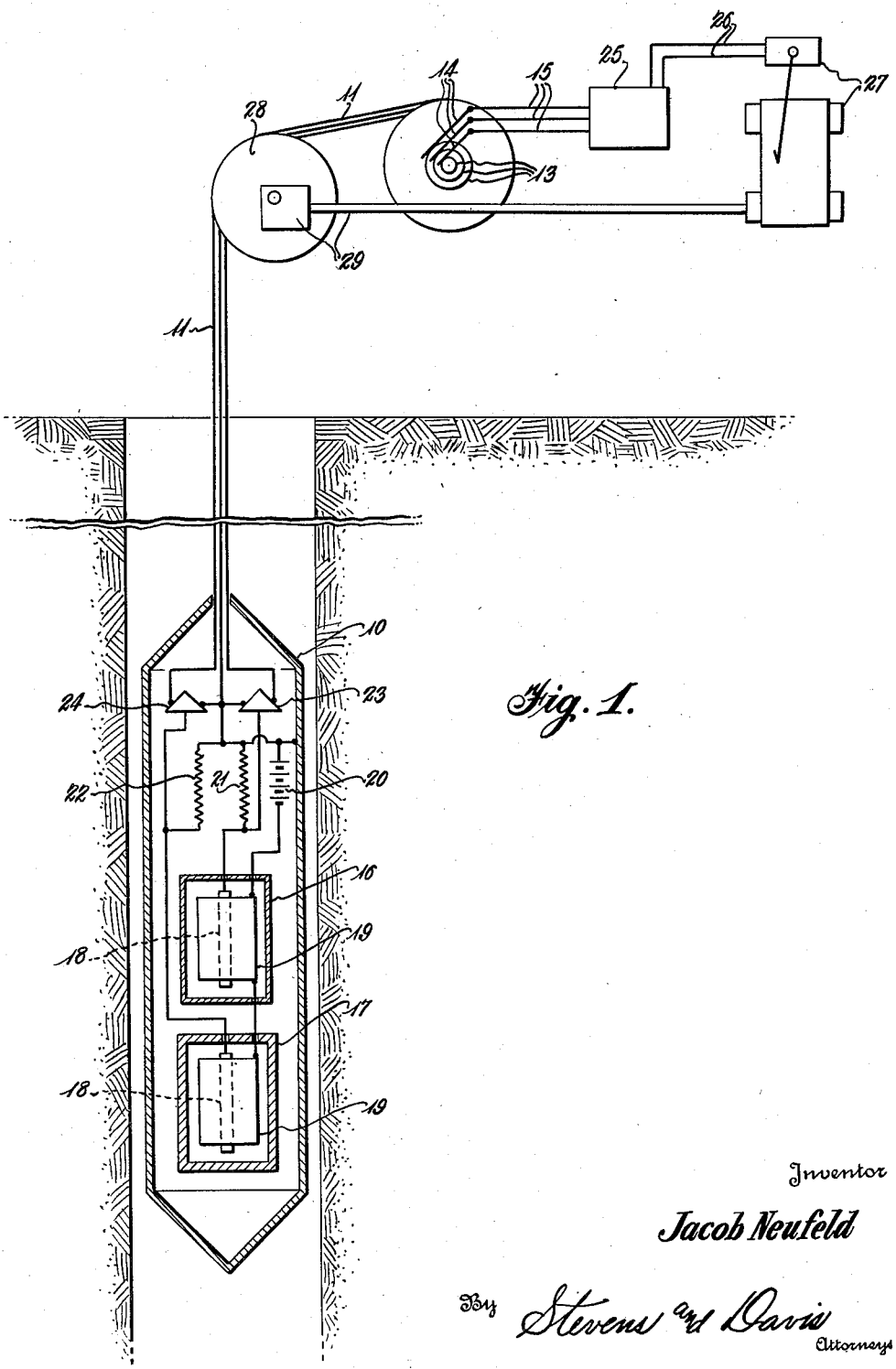

Sept. 15, 1942.  J. NEUFELD  2,296,176
WELL SURVEY METHOD AND APPARATUS
Filed March 9, 1940   2 Sheets—Sheet 1

Inventor
Jacob Neufeld
By Stevens and Davis
Attorneys

Sept. 15, 1942. J. NEUFELD 2,296,176
WELL SURVEY METHOD AND APPARATUS
Filed March 9, 1940 2 Sheets—Sheet 2

Inventor
Jacob Neufeld
By Stevens and Davis
Attorneys

Patented Sept. 15, 1942

2,296,176

UNITED STATES PATENT OFFICE 2,296,176

WELL SURVEY METHOD AND APPARATUS

Jacob Neufeld, Tulsa, Okla., assignor to Well Surveys, Incorporated, Tulsa, Okla., a corporation of Delaware Application March 9, 1940, Serial No. 323,239

16 Claims. (Cl. 250—83.6)

This invention relates to the art of geophysical prospecting and more particularly to the art of measuring radioactive radiations in drill holes and the like as indications of the nature of the subsurface formations adjacent the drill hole.

Methods and devices are already known for measuring the intensity of natural radiations that come from the formations surrounding a drill hole and pass through the drill hole. Methods and devices have also been suggested for exposing the formations adjacent the drill hole to primary radiations and thus exciting secondary radiations or causing a scattering of primary radiations which can be measured. Little or no attention has been given, however, to the exact nature of the radiations measured and no effort has been made to analyze or determine the nature of these radiations.

It has now been discovered that various formations naturally emit radiations of various kinds, that is of various frequencies, and that if they are exposed to a primary source of radiations, they will send back to the drill hole secondary or scattered radiations having particular and determinable characteristics of quality, i. e. frequency that give information about the formations that cannot be gained by a mere determination of the intensity of the radiations. It has further been discovered that by proper arrangement of apparatus measurements can be made which will indicate the spectral or frequency distribution of the radiations detected whether they be natural radiations or artificially induced ones.

The basic principle of the present invention involves the use of two or more detecting instruments so constructed and arranged that they are sensitive to radiations of different frequency ranges. These instruments are so interconnected that the measurements which they make are combined into a measurement indicative of the balance between the measurements of the individual instruments, and hence of the spectral or frequency distribution of the radiations causing the measurements.

The manufacture of instruments that will be sensitive to different frequency ranges is made possible by the fact that the harder or higher frequency rays have more penetrating power than the lower frequency waves and hence one measuring instrument can be used to measure a wide band of frequencies and another shielded so as to measure only the harder or higher frequency waves.

In the preferred embodiment the instruments are adapted to measure gamma rays, one of the instruments being arranged to measure as wide a range of frequencies as possible and the other instrument being shielded so that it measures only the harder or higher frequency gamma rays. The resultant measurements are then divided one into the other to give a quotient which varies as the spectral or frequency distribution of the gamma rays varies but does not vary with general increases or decreases in gamma ray intensity. Obviously, a measurement of total gamma ray intensity can be made simultaneously, in fact with the same instrument, if so desired.

The present invention is especially well adapted for making measurements to determine the nature of structures adjacent bore holes for it is extremely difficult to determine the nature of such structures by taking samples and the present method can be applied even though the bore hole is cased and the measurement must be taken through the steel casing. The present method and apparatus may also be used for surface prospecting or in the analysis of cores taken from a well or other samples.

In its preferred embodiment the present invention consists of a pair of ionization chambers each containing spaced electrodes in a high pressure inert gas and one of which is more heavily shielded than the other. The relative amounts and pressures of the gases are adjusted to adjust the relative outputs of the chambers so as to facilitate their ultimate combining. Amplifiers are provided to bring the outputs of the ionization chambers to the proper levels relative to each other and an electrical dividing circuit is used to divide the output of one ionization chamber by the output of the other and thus give a current which is proportional to the quotient of the two outputs. A recorder operated by this quotient current is driven from a cable used to lower the instrument into the well being surveyed so that the depth at which the survey is being made is at all times correlated to the record of the spectral or frequency distribution of the radiations. Such a device may be used to detect natural radioactive radiations or by lowering a source of primary radiations into the well at the same time and shielding the instrument from direct radiations from the primary source the instrument may be used to measure secondary or scattered radiations.

Figure 2:
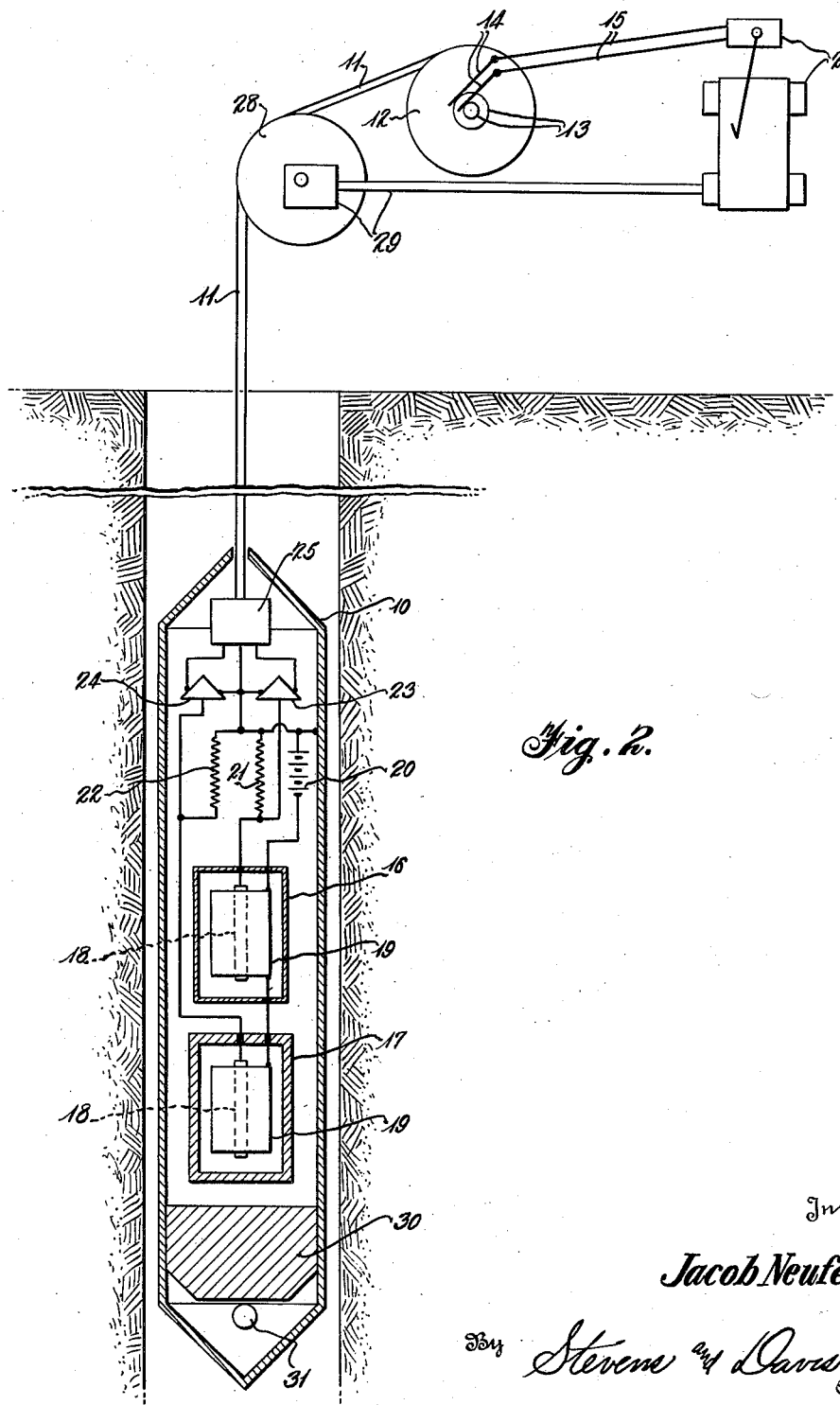

In the drawings:

Figure 1 is a diagrammatic illustration of a device for measuring natural radiations and Figure 2 is a diagrammatic illustration of a similar device for measuring secondary or scattered radiations. These devices are shown and will be described as the preferred embodiments of the principles of this invention but with no intention that they be considered as limiting the scope thereof. Further, it will be apparent to those skilled in the art that many other modifications of the process and devices may be made while still following the principles of this invention and within the scope and sphere of it.

The device, as illustrated in both figures, consists of a capsule or main housing 10 which is adapted to be lowered into a drill hole at the end of a supporting and conducting cable 11 which serves both to support the capsule in the well and convey measuring currents from the capsule to the surface. At the surface the cable 11 is wound on to a drum 12 and the electrical conductors included in it are connected to commutator rings 13 from which the measuring currents are picked up by brushes 14 and carried through conductors 15 to the surface equipment.

In the capsule, in each of the two embodiments shown, there are contained a pair of ionization chambers 16 and 17. The wall of the ionization chamber 17 is considerably thicker than the wall of the ionization chamber 16 so that while a wide range of frequencies of radiations may pass into the chamber 16 only those of higher frequency may pass into chamber 17. Preferably the wall of ionization chamber 17, will consist of 4 to 6 centimeters thickness of iron. Each chamber contains a gas such as nitrogen or argon under a relatively high pressure for example, around 1200 pounds per square inch of argon is preferred and each also contains a central electrode 18 and an outer electrode 19, the inner electrode consisting of an iron rod and the outer electrode consisting of a surrounding cylinder spaced therefrom. The two outer electrodes 19 are connected together and to the negative terminal of a battery 20. A resistor 21 is connected between the positive terminal of the battery 20 and the inner electrode of the chamber 16 while a resistor 22 is similarly connected between the positive electrode of the battery 20 and the inner electrode of the other chamber 17. Preferably the positive terminal of the battery 20 is also grounded to the container or main housing 10. With such a circuit the voltage drop across resistors 21 and 22 is proportional to the currents flowing in the ionization chambers and these currents are proportional in turn to the intensity of the radiations that reach the inside of the respective chambers.

In the embodiment shown from measuring natural radio-activity, Figure 1, the voltage drops across the resistors 21 and 22 are applied to amplifiers 23 and 24, respectively, and the resultant currents are sent through the connecting and supporting cable to the surface of the ground. Here, after passing through the conductor rings 13, the brushes 14 and the connections 15 they reach an electronic divider 25 which divides one of the currents into the other to give a current which is proportional to the quotient. An electronic divider that may be used for this purpose is shown in Patent No. 2,129,880 granted September 19, 1938, to Serge A. Scherbatskoy and Jacob Newfeld.

From the divider the quotient current is carried by connections 26 to a recorder 27 where it is recorded in correlation with the record of the depth at which the measurement is being taken. This is accomplished by driving the recorder in accordance with the movements of the supporting cable up and down in the well. To accomplish this the cable may be arranged to move against a wheel 28 as it moves up and down in the well and this wheel may drive the recorder through a suitable arrangement of gears and shaft 29 or through an electrical transmission system such as a Selsyn transmission.

The device shown in Figure 2 differs in some respects from that shown in Figure 1 in that it is arranged to provide for the measurement of reflected or scattered or secondary radiations and in that the electrical dividing circuit is positioned in the capsule 10 rather than on the surface of the ground. For the purpose of arranging the device so that it will measure secondary or scattered radiations a heavy shield 30 of lead or the like is arranged below the ionization chambers and below this shield is a source of primary radiations 31 which may be of any desired nature, for example, a mixture of radium and berylium, methothorium, or sodium activated by alpha ray exposure.

In addition to what has been illustrated in the two figures of the drawing it is possible to make an additional record, if desired on the same recorder and using the output of the unshielded ionization chamber 16, to give in addition to the record of the spectral distribution of the radiations a record of the total intensity of the radiations that can be measured by the unshielded ionization chamber 16. Furthermore, by proper construction of the detection units, neutrons or other radiations may be measured as well as gamma rays. Also, more than two differently shielded ionization chambers may be used if desired to get a more complete picture of the spectral distribution of the radiations being measured. Still further, the intensity of the radiations reaching the inside of the two chambers may be recorded separately and the division of one into the other to obtain an index of frequency distribution may be performed manually or by other devices than the electronic divider mentioned.

I claim:

1. A method of geophysical prospecting that comprises separately simultaneously measuring the intensity of radioactive radiations of a plurality of frequency ranges coming from a formation about which information is desired, and dividing one of said measurements by another in such a manner as to give a measurement indicative of the frequency distribution of said radiations.

2. A method of geophysical prospecting that comprises measuring the intensity of radioactive radiations of one range of frequencies coming from a formation about which information is desired, simultaneously measuring the intensity of radioactive radiations of another range of frequencies coming from said formation and dividing one of said measurements by another in such a manner as to give a measurement indicative of the frequency distribution of said radiations.

3. A method of geophysical prospecting that comprises measuring the intensity of gamma rays of one range of frequencies coming from a formation about which information is desired, simultaneously measuring the intensity of gamma rays in another range of frequencies coming from said formation, dividing one of said measurements in such a manner as to give a measurement by another indicative of the frequency distribution of said gamma rays.

4. A method of geophysical prospecting that comprises separately simultaneously measuring the intensity of gamma rays of a plurality of frequency ranges coming from a formation about which information is desired, and dividing one of said measurements by another in such a manner as to give a measurement indicative of the frequency distribution of said gamma rays.

5. A method of geophysical prospecting that comprises measuring at various depths in a drill hole the intensity of radioactive radiations of one range of frequencies coming from a formation adjacent the drill hole, simultaneously measuring the intensity of radioactive radiations of another range of frequencies coming from the same formation and dividing one of the measurements by another in such a manner as to give a measurement indicative of the frequency distribution of said radiations.

6. A method of geophysical prospecting that comprises measuring the intensity of radioactive radiations of a relatively wide range of frequencies coming from a formation about which information is desired, simultaneously measuring the intensity of radioactive radiations of a relatively narrower range of frequencies coming from said formation, and dividing one of said measurements by another in such a manner as to give a measurement indicative of the frequency distribution of said radiations.

7. A method of geophysical prospecting that comprises measuring the intensity of gamma rays of a relatively wide range of frequencies coming from a formation about which information is desired, simultaneously measuring the intensity of the gamma rays of a relatively narrower range of frequencies within said first mentioned range and coming from said formation dividing one of said measurements by another in such a manner as to give a measurement indicative of the frequency distribution of said gamma rays.

8. A method of geophysical prospecting that comprises measuring the intensity of radioactive radiations of a relatively wide range of frequencies coming from a formation about which information is desired, measuring the intensity of radioactive radiations of a relatively narrower range of frequencies coming from said formation and dividing the measurement of the relatively narrower range of frequencies into the measurement of the relatively wider range of frequencies to obtain a measurement indicative of the frequency distribution of said radiations.

9. A method of geophysical prospecting that comprises measuring at various levels in a drill hole the intensity of radioactive radiations of a relatively wide range of frequencies coming from a formation adjacent the drill hole, measuring the intensity of radioactive radiations of a relatively narrower range of frequencies coming from said same formation and dividing the measurement of the narrower range of frequencies into the measurement of the wider range of frequencies to give a measurement indicative of the frequency distribution of the radiations.

10. A method of geophysical prospecting that comprises measuring the intensity of natural radioactive radiations of a relatively wide range of frequencies coming from a formation about which information is desired, simultaneously measuring the intensity of the natural radioactive radiations of a relatively narrower range of frequencies coming from said formation and dividing one of said measurements by another in such a manner as to give the measurement indicative of the frequency distribution of said radiations.

11. A method of geophysical prospecting that comprises measuring the intensity of artificially induced radioactive radiations of a relatively wide range of frequencies coming from a formation about which information is desired, simultaneously measuring the intensity of artificially induced radioactive radiations of a relatively narrower range of frequencies coming from said formation and dividing one of said measurements by another in such a manner as to give a measurement indicative of the frequency distribution of said radiations.

12. A method of geophysical prospecting that comprises measuring at various levels in a drill hole the intensity of the natural gamma radiations of a relatively wide range of frequencies coming from a formation adjacent the drill hole, measuring at the same places the intensity of the natural gamma radiations of a relatively narrower range of frequencies coming from said formation and dividing the measurement of the narrower range of gamma radiations into the measurement of the relatively wider range of gamma radiations to get a measurement indicative of the frequency distribution of said radiations.

13. A method of geophysical prospecting that comprises measuring at various levels in a drill hole the intensity of artificially induced gamma radiations of a relatively wide range of frequencies coming from a formation adjacent the drill hole, simultaneously measuring the intensity of artificially induced gamma radiations of a relatively narrower range of frequencies at the same places and coming from the same formation and dividing one of the measurements by another to give a measurement indicative of the frequency distribution of said radiations.

14. A device for geophysical prospecting that comprises means for separately simultaneously measuring the intensity of radioactive radiations of a plurality of frequency ranges coming from a formation about which information is desired, and means for dividing one of said measurements by another in such a manner as to get a measurement indicative of the frequency distribution of said radiations.

15. A device for geophysical prospecting that comprises a capsule, means to support said capsule in a drill hole and convey currents from said capsule to the surface of the earth, a plurality of differently shielded ionization chambers in said capsule, means to impress a potential across the electrodes of said ionization chambers, means in said capsule to generate currents proportional to the current flows in said ionization chambers, means to divide said current flows one into the other and means to record a current flow proportional to the resultant quotient.

16. A device for geophysical prospecting that comprises a capsule, means to support said capsule in a drill hole and convey currents from said capsule to the surface of the earth, a plurality of differently shielded ionization chambers in said capsule, means to impress a potential across the electrodes of said ionization chambers, means in said capsule to generate currents proportional to the current flows in said ionization chambers, means to divide said current flows one into the other and means to correlate the record of said quotient current with a record of the depth at which the measurements are being taken.

JACOB NEUFELD.

CERTIFICATE OF CORRECTION.

Patent No. 2,296,176.  September 15, 1942.

JACOB NEUFELD.

It is hereby certified that error appears in the printed specification of the above numbered patent requiring correction as follows: Page 2, first column, line 62, surname of second named patentee, for "Newfeld" read --Neufeld--; and second column, line 68, claim 3, strike out the words "by another" and insert the same after the syllable "ments" in line 67, same claim; page 3, first column, line 32, claim 7, before "dividing" insert --and--; and that the said Letters Patent should be read with this correction therein that the same may conform to the record of the case in the Patent Office.

Signed and sealed this 20th day of October, A. D. 1942.

Henry Van Arsdale,
Acting Commissioner of Patents.

(Seal)